United States Patent [19]

Stappaerts

[11] Patent Number: 4,523,320
[45] Date of Patent: Jun. 11, 1985

[54] UNIFORM-FIELD ELECTRODE

[75] Inventor: Eddy A. Stappaerts, Rancho Palos Verdes, Calif.

[73] Assignee: Northrop Corporation, Hawthorne, Calif.

[21] Appl. No.: 457,985

[22] Filed: Jan. 14, 1983

[51] Int. Cl.³ .............................................. H01S 3/00
[52] U.S. Cl. ...................................... 372/87; 313/631
[58] Field of Search .................... 372/81, 87; 313/621, 313/631

[56] References Cited

U.S. PATENT DOCUMENTS 4,210,877  7/1980  Pleasance et al. .................... 372/87

Primary Examiner—William L. Sikes
Assistant Examiner—Robert E. Wise
Attorney, Agent, or Firm—Terry J. Anderson

[57] ABSTRACT

A pair of electrodes for producing a very uniform electric field within a predetermined region. The electrodes have a special theoretically-derived shape which inherently terminates the electrodes just outside the predetermined region, thereby overcoming any need to empirically truncate the design to achieve compactness and low inductance. In contrast to conventional truncated designs, the performance of electrodes shaped according to the present invention is analytically predictable, thereby minimizing the need for time-consuming experimentation.

2 Claims, 4 Drawing Figures

UNIFORM-FIELD ELECTRODE

BACKGROUND OF THE INVENTION

1. Field of the Invention

The present invention relates to specially shaped electrodes for producing a very uniform electric field, especially as used to create an electric discharge to excite gas lasers.

2. Description of the Prior Art

Specially shaped electrodes for generating a uniform electric field throughout a specified region of space are required in many applications. An especially important application is the generation of uniform, large volume, pulsed electrical discharges in transversely excited gas lasers. Other applications include designing high-voltage components and measuring the breakdown field strength of gases.

A transversely excited gas laser is a gas laser excited by an electric discharge arising from a transverse electric field between a pair of electrodes disposed on opposite sides of a gas-filled laser cavity. It is well known that the electric field strength between the electrodes should be as uniform as possible throughout the region in which the electric discharge is to occur in order to achieve high laser conversion efficiency and a spatially uniform output beam.

Because of fringe effects near the edges of flat electrodes, all known electrode designs for achieving a uniform electric field strength throughout a predetermined region require the electrodes to extend considerably beyond the region. Unfortunately, extending the electrodes lessens the compactness of the apparatus and, even more importantly, increases the inductance of the electrodes, thereby lengthening the rise and fall times of electrical current pulses applied thereto. This reduces the conversion efficiency of lasers, such as excimer lasers, whose gain media have relatively short lifetimes in their excited state.

To avoid the disadvantages of overly extended electrodes, most prior art designs adhere to a chosen theoretical contour in the central region of the electrode and then truncate or round off the edges of the electrode at some empirically determined point. This results in a degradation in the uniformity of the electric field which is difficult to predict analytically and must be overcome by modifying the electrode shape by laborious trial and error.

SUMMARY OF THE INVENTION

The present invention comprises a pair of electrodes having a special theoretically-derived shape. When connected to a voltage source, the electrodes of the present invention produce an electric field whose strength is very uniform within a predetermined region and rapidly drops off outside the region. The theoretically-derived shape inherently terminates the electrodes just outside the predetermined region, thereby overcoming any need to empirically truncate a theoretical design to achieve compactness and low inductance. In contrast to conventional truncated designs, the performance of electrodes shaped according to the present invention is analytically predictable, thereby minimizing the need for time-consuming experimentation.

DETAILED DESCRIPTION OF THE PREFERRED EMBODIMENTS

Figure 1:
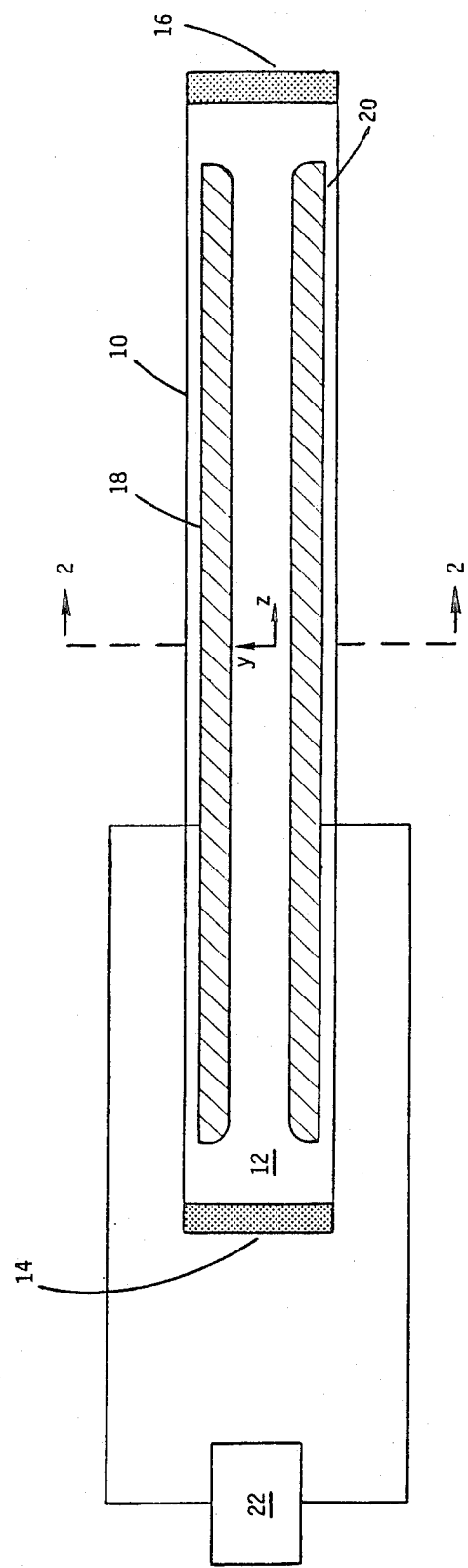
FIG. 1 is a longitudinal sectional view of the present invention, including a schematic representation of its connection to a power source.

FIG. 1 is a simplified drawing of a transversely excited gas laser employing a pair of electrodes according to the present invention. An envelope or tube 10 contains a gas 12 which constitutes the laser gain medium. Reflectors 14 and 16 at either end of the envelope define the endpoints of the laser cavity. The laser is excited by an electric field between two parallel electrodes 18 and 20 within the envelope 10. The electric field is produced by connecting a voltage source 22 across the two electrodes. In most applications, voltage source 22 produces periodic short voltage pulses so that the laser emits periodic pulses of light.

The shape of the electrodes is most easily defined with reference to a 3-dimensional Cartesian coordinate system having X, Y and Z principal axes whose origin is at the center of symmetry of the electrode pair. FIG. 1 shows the Y and Z axes as lying in the plane of the drawing. The X-axis is perpendicular to the Y-Z plane. The Y-axis is perpendicular to the inward-facing surfaces of the two electrodes 18 and 20. The Z-axis is coincident with the longitudinal axis of the laser tube 10. Each electrode 18 and 20 extends longitudinally within the laser envelope 10 in a direction parallel to the Z-axis.

Figure 2:
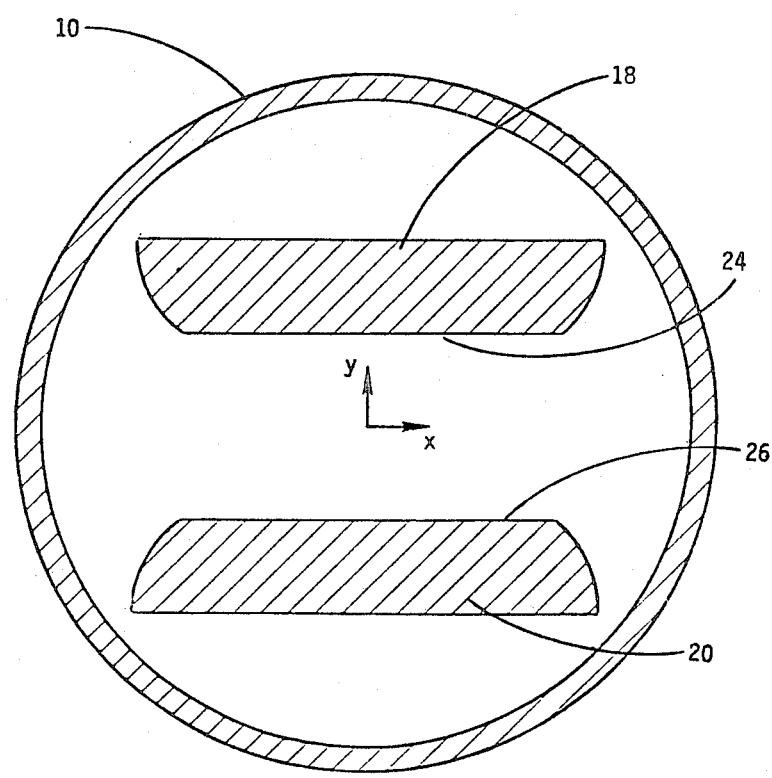
FIG. 2 is a transverse sectional view of the present invention.

FIG. 2 shows a transverse cross-section in the X-Y plane of the laser envelope 10 and electrodes 18 and 20. To achieve a uniform electric field strength through the region between the electrodes 18 and 20, each of the inward facing surfaces 24 and 26 of the two electrodes has an almost flat central portion. Outside the central portion, the electrode surface rapidly curves away from the X-Z plane so that the electrode is very compact.

The unique shape of the electrode of the present invention is derived from a desired electric field distribution in the X-Z plane, the plane of symmetry midway between the two electrodes. Specifically, the value of the electric field in the X-Z plane is given by Equations (1) as follows:

$$E_x(x,z; y=0)=0 \qquad (1a)$$

$$E_y(x,z; y=0)=E_o/(1+(1-p)x^2+px^4) \qquad (1b)$$

$$E_z(x,z; y=0)=0 \qquad (1c)$$

$$0.18<p\leq 1 \qquad (1d)$$

In all the equations herein, $E_x$, $E_y$, and $E_z$ respectively represent the X, Y and Z components of the electric field strength. $E_o$, which represents the electric field strength at the central point x=y=z=0, is determined by the electrode voltage and spacing. All equations are based on the assumption that the electrodes are much longer in the Z-direction than in the X and Y directions, so that the electric field has essentially no Z-component and has X and Y components which are essentially independent of position in the Z-dimension.

Figure 3:
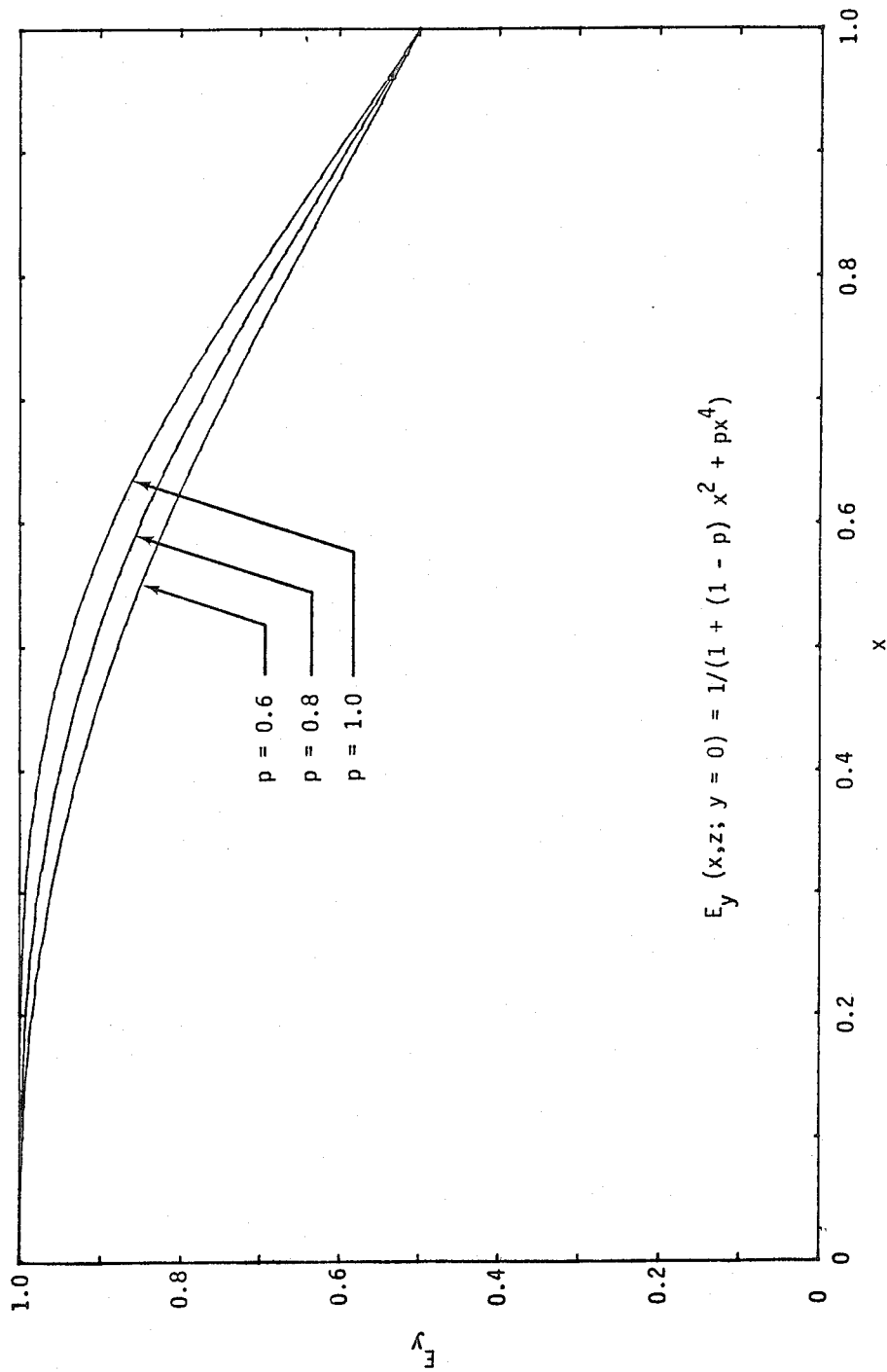
FIG. 3 is a graph showing the midplane electric field distribution for different values of the parameter p.

Equations (1) define a family of electric field distributions corresponding to different values of the parameter p, which in the present invention has a value between 0.18 and one. FIG. 3 illustrates the midplane electric field distributions defined by Equation (1b) for various values of the parameter p. For values of p close to one, the electric field is quite uniform throughout the central region corresponding to small values of X, and the field strength rapidly drops off outside this region.

If p=1, Equation (1b) is a second-order Butterworth function, which is commonly applied to the design of electrical low-pass filters having a frequency response uniform below a certain point and rapidly falling off above that point. The present inventor is unaware of any prior electrode designs for achieving an electric field distribution having the Butterworth characteristic.

Equations (1) describe the electric field strength in the midplane only, i.e., in the X-Z plane midway between the two electrodes. The electric field strength throughout the region between the two electrodes is given by the following more complex Equations (2):

$$E_x/E_o = (a^2 - b^2 - ax + by)/[(x - a)^2 + (y - b)^2] - \quad (2a)$$
$$(a^2 - b^2 - ax - by)/[(x - a)^2 + (y + b)^2] -$$
$$(a^2 - b^2 + ax + by)/[(x + a)^2 + (y - b)^2] +$$
$$(a^2 - b^2 + ax - by)/[(x + a)^2 + (y + b)^2]$$

$$E_y/E_o = (2ab - ay - bx)/[(x - a)^2 + (y - b)^2] + \quad (2b)$$
$$(2ab + ay - bx)/[(x - a)^2 + (y + b)^2] +$$
$$(2ab - ay + bx)/[(x + a)^2 + (y - b)^2] +$$
$$(2ab + ay + bx)/[(x + a)^2 + (y + b)^2]$$

$$E_z = 0 \quad (2c)$$

where $a^2 = (2\sqrt{p} - 1 + p)/(4p)$ \quad (2d)

$$b^2 = (2\sqrt{p} + 1 - p)/(4p) \quad (2e)$$

$$.18 < p \leq 1 \quad (2f)$$

The parameter p, defined earlier, is the only independent parameter in Equations (2). Parameters a and b are completely determined by p and are introduced only to simplify the equations.

The foregoing equations describe the electric field produced by the electrodes of the present invention but do not specify the shapes of the electrodes themselves. For any particular electric field pattern, uniquely specified by the designer's chosen value of the parameter p, there is a family of different electrode shapes that will produce that electric field pattern. Specifically, a given electric field distribution will be produced between a pair of electrodes whose inward-facing surfaces coincide with any two equipotential surfaces or contours of that field distribution. In the case of the electric field distribution described by Equations (2), because the electric field's Z-component is zero and its X and Y components are independent of Z, the equipotential surfaces are the family of surfaces which longitudinally extend parallel to the Z-axis and whose transverse cross-sections have contours satisfying the following differential equation, wherein $E_x$ and $E_y$ are the functions of x, y and p given in Equations (2a) and (2b):

$$dy/dx = -E_x/E_y \quad (3)$$

A particular member of the family of surfaces satisfying Equation (3) may be selected by specifying a single point on that surface. The most convenient point to specify is the y-intercept $y_o$ of the surface. Therefore, the electrode of the present invention is characterized by two parameters—p and $y_o$.

In summary, the present invention comprises a pair of electrodes 18 and 20 disposed on opposite sides of the X-Z plane. Each electrode has an inner surface 24 or 26 facing the other electrode, this surface having its longitudinal dimension parallel to the Z-axis and having a transverse cross-section whose contour is a member of the family of contours which satisfy Equation (3).

When a voltage is applied between the two electrodes, an electric field having the distribution described by Equations (1) and (2) is produced between the electrodes. The electric field is highly uniform throughout the central region corresponding to small values of X, and the field strength rapidly drops off outside this region.

Figure 4:
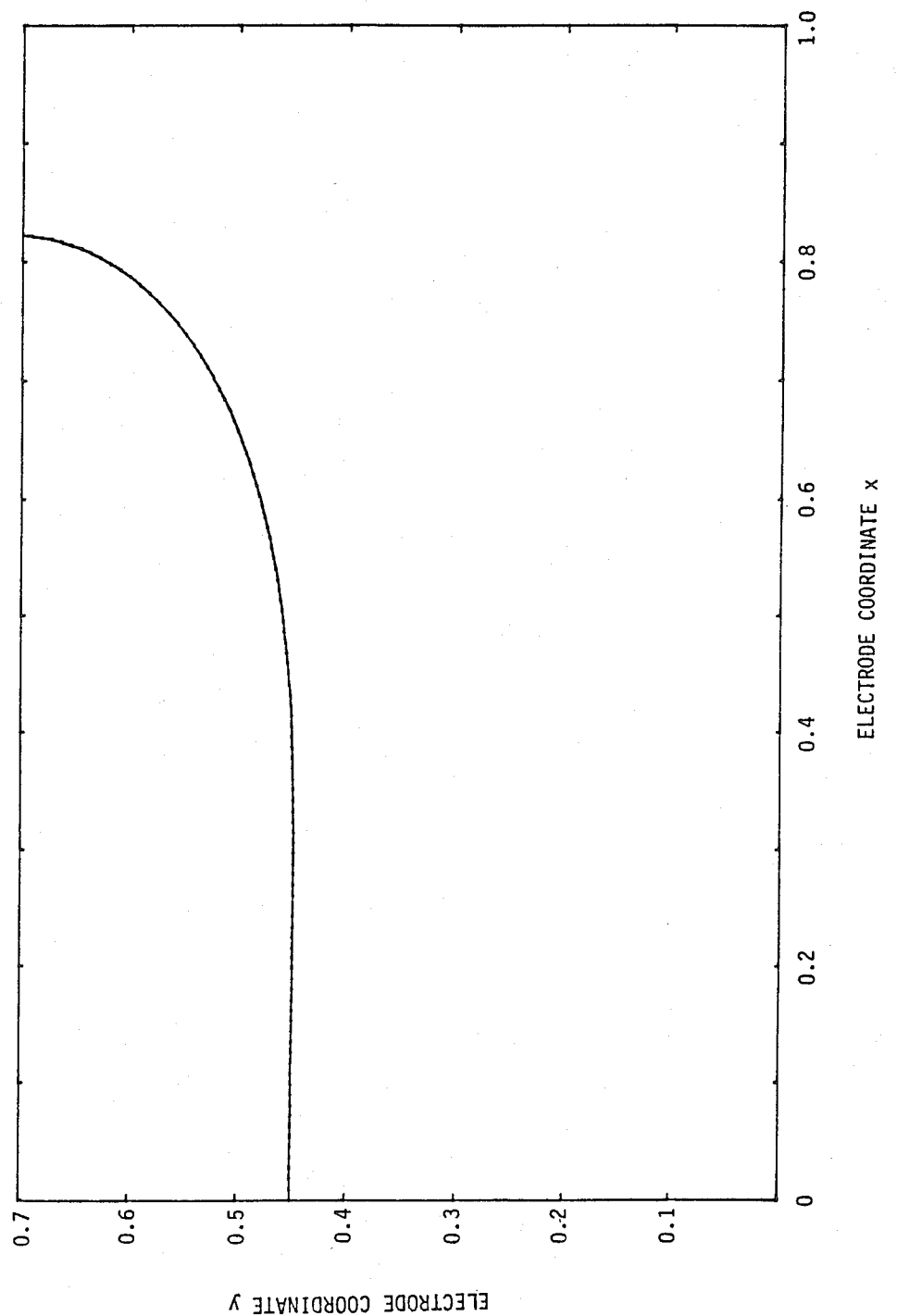
FIG. 4 is a graph showing the transverse contour of an electrode according to the present invention for the parameter p=0.8 and $y_o$=0.45.

FIG. 4 shows the equipotential contour satisfying Equation (3) when the parameter p has the value 0.8 and the y-intercept $y_o$ equals 0.45. (Since the electrodes are symmetrical about the Y-axis, FIG. 4 shows only the right half of each equipotential contour, the left half being a mirror image of the right half.) FIG. 4 illustrates that the equipotential contours, and hence the corresponding electrodes, are essentially parallel to the midplane (the X-Z plane) throughout the central region corresponding to $-0.5 < X < 0.5$, and they rapidly curve away from the midplane just outside this central region. The edges of the electrodes are at the points $X = \pm 0.82$ where the electrode surfaces 24 and 26 are essentially perpendicular to the midplane.

FIG. 4 illustrates that the electrodes of the present invention have a relatively sharp curvature outside the flat central portion, and hence the curved portion of the electrode is relatively short. In contrast, conventional analytical electrode designs generally have a more gradual curvature outside the flat central portion, so that the curved portion of the electrode is longer. As a result, conventional electrodes generally must either be much wider than the present electrode and hence have a greater inductance, or else they must be truncated so much that they no longer produce the analytically predicted electric field distribution and must be adjusted empirically to achieve adequate field uniformity.

In all the foregoing equations and figures, X and Y are normalized coordinates which may be multiplied by any desired scale factor K to convert them to physical coordinates X' and Y', where X'=KX and Y'=KY. Letting $y_o'$ represent the spacing between the electrodes and the midplane (so that the interelectrode spacing equals $2 \cdot y_o'$, then the physical electrode spacing relates to $y_o$, the normalized y-intercept of the electrode surface, as follows: $y_o' = K y_o$.

For example, if the electrode design shown in FIG. 4 (in which $y_o = 0.45$ normalized units) were constructed on a physical scale in which the spacing between the electrodes was 3 cm (i.e., $y_o' = 3$ cm/2 = 1.5 cm), then the value of the scale factor K would be $K = y_o'/y_o = 1.5$ cm/0.45 units = 3.3 cm/unit.

In designing electrodes to produce a desired electric discharge, it should be observed that the parameter p determines the uniformity and width (along the X-axis) of the discharge, and the y-intercept $y_o$ determines the height (along the Y-axis) of the discharge.

As discussed earlier, the transverse contour of an electrode according to the present invention is a solution of the differential equation in Equation (3). A simple method of solving the equation is to first choose an initial point on the contour, and then find the remaining points on the contour by one of the standard numerical integration techniques such as Taylor's rule or Simpson's rule. The most convenient choice for the initial point is $y_o$ (the Y-intercept of the contour) which, based on the preceding discussion of the scale factor K, equals one-half the desired physical spacing between the electrodes divided by K.

I claim:

1. Apparatus for producing a uniform electric field, the apparatus being defined relative to a 3-dimensional Cartesian coordinate system having X, Y and Z principal axes, comprising:

two elongated electrodes disposed on opposite sides of the X-Z plane; and means for applying a voltage between the two electrodes;

each electrode having a surface facing the other electrode which is symmetrical about the Y-Z plane, which has its longitudinal dimension parallel to the Z-axis, and which has a transverse cross-section whose contour satisfies the following equation:

$$dy/dx = -E_x/E_y$$

wherein $E_x$ and $E_y$ are the following fuctions of x and y:

$$E_x/E_o = (a^2 - b^2 - ax + by)/[(x - a)^2 + (y - b)^2]$$
$$- (a^2 - b^2 - ax - by)/[(x - a)^2 + (y + b)^2]$$
$$- (a^2 - b^2 + ax + by)/[(x + a)^2 + (y - b)^2]$$
$$+ (a^2 - b^2 + ax - by)/[(x + a)^2 + (y + b)^2]$$
$$E_y/E_o = (2ab - ay - bx)/[(x - a)^2 + (y - b)^2]$$
$$+ (2ab + ay - bx)/[(x - a)^2 + (y + b)^2]$$
$$+ (2ab - ay + bx)/[(x + a)^2 + (y - b)^2]$$
$$+ (2ab + ay + bx)/[(x + a)^2 + (y + b)^2]$$

and wherein $E_o$ is a scale factor having any desired value either greater than or less than zero and a and b are parameters whose values are uniquely determined as follows by a parameter p having a value greater than 0.18 and less than or equal to one:

$$a^2 = (2\sqrt{p} - 1 + p)/(4p)$$

$$b^2 = (2\sqrt{p} + 1 - p)/(4p).$$

2. A laser excited by an electric field between two electrodes, the laser being defined relative to a 3-dimensional Cartesian coordinate system having x, y and z principal axes, comprising:

an elongated laser gain medium having a longitudinal axis coincident with the z-axis;

two elongated electrodes disposed on opposite sides of the X-Z plane; and means for applying a voltage between the two electrodes;

each electrode having a surface facing the other electrode which is symmetrical about the Y-Z plane, which has its longitudinal dimension parallel to the Z-axis, and which has a transverse cross-section whose contour satisfies the following equation:

$$dy/dx = -E_x/E_y$$

wherein $E_x$ and $E_y$ are the following fuctions of x and y:

$$E_x/E_o = (a^2 - b^2 - ax + by)/[(x - a)^2 + (y - b)^2]$$
$$- (a^2 - b^2 - ax - by)/[(x - a)^2 + (y + b)^2]$$
$$- (a^2 - b^2 + ax + by)/[(x + a)^2 + (y - b)^2]$$
$$+ (a^2 - b^2 + ax - by)/[(x + a)^2 + (y + b)^2]$$
$$E_y/E_o = (2ab - ay - bx)/[(x - a)^2 + (y - b)^2]$$
$$+ (2ab + ay - bx)/[(x - a)^2 + (y + b)^2]$$
$$+ (2ab - ay + bx)/[(x + a)^2 + (y - b)^2]$$
$$+ (2ab + ay + bx)/[(x + a)^2 + (y + b)^2]$$

and wherein $E_o$ is a scale factor having any desired value either greater than or less than zero and a and b are parameters whose values are uniquely determined as follows by a parameter p having a value greater than 0.18 and less than or equal to one:

$$a^2 = (2\sqrt{p} - 1 + p)/(4p)$$

$$b^2 = (2\sqrt{p} + 1 - p)/(4p).$$

* * * * *